United States Patent [19]

Fishback et al.

[11] Patent Number: 5,385,952

[45] Date of Patent: Jan. 31, 1995

[54] FLAME RESISTANT RIGID POLYURETHANE FOAMS CONTAINING PHOSPHORUS AND A HALOGEN

[75] Inventors: Thomas L. Fishback, Gibraltar; Curtis J. Reichel, Southgate, both of Mich.

[73] Assignee: BASF Corporation, Mount Olive, N.J.

[21] Appl. No.: 292,114

[22] Filed: Aug. 17, 1994

[51] Int. Cl.⁶ .................. C08G 18/06; C08G 18/08
[52] U.S. Cl. .................... 521/131; 521/168; 521/169; 521/172; 521/174
[58] Field of Search ............ 521/131, 168, 169, 172, 521/174

[56] References Cited

U.S. PATENT DOCUMENTS

| | | |
|---|---|---|
| 3,639,541 | 2/1972 | Austin et al. . |
| 3,639,542 | 2/1972 | Pizzini et al. . |
| 3,639,543 | 2/1972 | Newton et al. . |
| 3,660,314 | 5/1972 | Vandenberg . |
| 3,668,154 | 6/1972 | Buisson . |
| 3,682,988 | 8/1972 | Lewis . |
| 3,760,038 | 9/1973 | Lewis . |
| 3,764,640 | 10/1973 | Klose . |
| 3,767,732 | 10/1973 | Klose . |
| 3,840,622 | 10/1974 | Shim . |
| 3,878,270 | 4/1975 | Shim . |
| 3,879,501 | 4/1975 | Buisson . |
| 3,978,169 | 8/1976 | Nagy et al. . |
| 4,505,849 | 3/1985 | Staendeke et al. . |
| 4,616,044 | 10/1986 | Fesman . |
| 4,681,965 | 7/1987 | Speranza et al. . |
| 4,898,893 | 2/1990 | Ashida . |
| 4,981,879 | 1/1991 | Snider . |
| 5,064,872 | 11/1991 | Monstrey et al. . |
| 5,096,933 | 3/1992 | Volkert . |
| 5,132,332 | 7/1992 | Wallaeys et al. . |
| 5,182,309 | 1/1993 | Hützen . |
| 5,268,393 | 12/1993 | Blount . |

OTHER PUBLICATIONS

Polyurethane Handbook, Chemistry-Raw Materials--Processing-Application-Properties, pp. 102 & 103, 1985.

Polyurethanes World Congress 1993, Oct. 10-13, 1993, T. Fishback & C. Reichel, "Class 1 Isocyanurate Foams Blown with Pentane", pp. 247-251.

*Primary Examiner*—Morton Foelak
*Attorney, Agent, or Firm*—Dennis V. Carmen

[57] ABSTRACT

There is now provided a closed cell rigid polyurethane foam having improved flame resistance by empolying a combination of an organo-phosphorus compound having at least two isocyanate reactive hydrogens with a secondary or tertiary mono-halogenated aliphatic hydrocarbon having three to six carbon atoms.

6 Claims, No Drawings

FLAME RESISTANT RIGID POLYURETHANE FOAMS CONTAINING PHOSPHORUS AND A HALOGEN

1. FIELD OF THE INVENTION

The invention relates to closed cell rigid polyurethane foams having improved flame resistance. In particular, the rigid closed cell polyurethane foams of the invention are made with an organo-phosphorus compound having at least two isocyanate reactive hydrogens in combination with a secondary or tertiary mono-halogenated aliphatic hydrocarbon having three to six carbon atoms.

2. BACKGROUND OF THE INVENTION

The polyurethane foam industry is well under way replacing the ozone depleting chlorofluorocarbons (CFCs) with more benign compounds such as hydrochlorofluorocarbons (HCFCs). However, HCFCs appear to be a temporary replacement; and efforts continue toward a permanent solution by employing blowing agents that have zero ozone depletion potential.

Hydrocarbons are a class of compounds receiving considerable attention as possible permanent solutions to HCFC-blown foams. Advantages of hydrocarbons include a zero ozone depletion potential, a very low global warming potential, and being liquids at room temperature. Hydrocarbons are also inexpensive when compared to HCFCs or hydrofluoroalkanes (HFAs). In addition, the technology for the safe handling of flammable blowing agents in a manufacturing environment already exists in practice. One major drawback to hydrocarbons, however, is their high degree of inherent flammability.

Insulation foams are closed cell polyurethane and/or polyisocyanurate foams. Such foams have applications in refrigeration cabinets, doors, and in the building construction industry where it is desired to retard as much as possible the flammability of the foam. Since insulation foams are closed cell, the blowing gases are trapped within the cells in the foam. Developing flame resistant insulating foams for the building construction industry is particularly difficult when the foam contains a flammable blowing agent.

SUMMARY OF THE INVENTION

There is now provided a closed cell polyurethane foam blown which exhibits excellent flame retardant properties. Under a Butler Chimney test, the polyurethane foam of the invention retains greater than 80 percent of its weight when the foam is indexed at 200 to 300 inclusive, and retains 85 percent or more of its weight when the foam is indexed at greater than 300. We have found that such a foam can be made by employing in the foam reaction mixture a composition of matter comprising an organo-phosphorus compound containing at least two isocyanate reactive hydrogens, in combination with a secondary or tertiary mono-halogenated aliphatic hydrocarbon co-blowing agent having from three to six carbon atoms, and preferably additionally blown with a liquid aliphatic non-halogenated hydrocarbon having two to seven carbons, a hydrochlorofluorocarbon, a hydrofluorocarbon, a fluorinated ether, a chemically active blowing agent, or mixtures thereof. A process for making the foam is also described herein.

DETAILED DESCRIPTION OF THE INVENTION

As noted above, many closed cell polyurethane foams blown may be blown with a flammable blowing agent such as a volatile liquid aliphatic hydrocarbons like pentane or cyclopentane. The blowing gases from flammable blowing agents remain trapped within the cells of the foam, requiring some modification to the foam to improve its flame retardancy. We have found that when an organo-phosphorus compound having at least two isocyanate reactive hydrogens, such as an organo-phosphite polyol, is added to a polyol composition along with the addition of a secondary or tertiary, mono-halogenated hydrocarbon having three to six carbon atoms such as 2-chloropropane, the combination exerts a synergistic effect upon the flame retardant properties of the rigid closed cell polyurethane/polyisocyanurate foam as measured by a Butler Chimney test. This synergistic effect was observable in spite of the presence of a flammable non-halogenated aliphatic hydrocarbon as the blowing agent, in contrast to the old conventional blowing agents such as the fully halogenated CFCs which were less flammable. We noticed that the flame retardant properties of a polyurethane foam only slightly improved when the secondary or tertiary, mono-halogenated hydrocarbon co-blowing agent was added to a foam reaction mixture containing a flammable co-blowing agent. We also noticed little or no difference in the flame retardant properties of a polyurethane foam made with an organo-phosphorus compound having at least two isocyanate reactive hydrogens when a flammable compound was used as the co-blowing agent. However, when the mono-halogenated, hydrocarbon co-blowing agent having three to six carbon atoms was combined in a foaming reaction mixture with the organo-phosphorus compound containing at least two isocyanate reactive hydrogens, we found that the flame retardant properties of the resultant foam were remarkably improved as measure by the Butler Chimney test. Without being bound to a theory, we believe that the synergistic effect we observed may be due to the combined char and self-extinguishing effect attributable to the ingredients. The organo-phosphorus compound used herein reacts with the isocyanate compound and becomes part of the polyurethane matrix, enabling a uniform distribution of the phosphorus compound and the development of a dimensionally strong char across the surface of the foam. It would appear, however, that the interior of the foam proximate to the hot surface char continues to burn despite the charring effect of the organo-phosphorus compound. The secondary or tertiary, mono-halogenated co-blowing hydrocarbon, when added to such a foam, may release free radical halogen atoms in a gaseous state which can combine with the free radical combustion products of the foam to form stable products at certain temperatures, lower the exotherm, and spatially lower the number of available oxygen atoms, thereby depriving the burning mass of a further fuel source and relatively cooling the foam to prevent further ignition of a flammable blowing agent in the interior foam cells or of the foam mass itself.

The polyol composition of the invention comprises a compound having at least two isocyanate reactive hydrogens, an organo-phosphorus compound having at least two isocyanate reactive hydrogens, and the mono-halogenated hydrocarbon, optionally along with catalysts, chain extenders, additive flame retardants, surfactants, and fillers. The polyol composition is reacted with an aromatic organic isocyanate in the presence of blowing agents.

The blowing agents may be pre-mixed with the polyol ingredients prior to reaction with the aromatic organic isocyanate, or a portion of the blowing agents may be added to the polyol composition prior to reaction with the isocyanate with the remainder of the blowing agents concurrently added as a separate stream, or a portion of the blowing agent ingredients may be premixed with the isocyanate prior to reaction. In a preferred embodiment, the polyol ingredients are premixed with the blowing agents, after which an aromatic organic isocyanate is added to make a closed cell rigid polyurethane foam.

Turning to the ingredients in the polyol composition, there is provided a polyol having at least two isocyanate reactive hydrogens. Preferably, polyhydroxyl compounds having a functionality of 2 to 8, more preferably 3 to 8, and an average hydroxyl number of 150 to 850, more preferably 350 to 800 are examples of polyols. Polyols having hydroxyl numbers outside this range may be used, but it is preferred that the average hydroxyl number for the total amount of polyols used fall within the range of 150 to 850.

Examples include polythioether polyols, polyester amides and polyacetals containing hydroxyl groups, aliphatic polycarbonates containing hydroxyl groups, amine terminated polyoxyalkylene polyethers, and preferably, polyester polyols and polyoxyalkylene polyether polyols. In addition, mixtures of at least two of the aforesaid polyols can be used as long as the combination has an average hydroxyl number in the aforesaid range.

The term "polyester polyol" as used in this specification and claims includes any minor amounts of unreacted polyol remaining after the preparation of the polyester polyol and/or unesterified polyol (e.g., glycol) added after the preparation of the polyester polyol. The polyester polyol can include up to about 40 weight percent free glycol.

The polyester polyols advantageously have an average functionality of about 1.8 to 8, preferably about 1.8 to 5, and more preferably about 2 to 3. Their hydroxyl number values generally fall within a range of about 15 to 750, preferably about 30 to 550, and more preferably about 150 to 500, and their free glycol content generally is from about 0 to 40, preferably from 2 to 30, and more preferably from 2 to 15 weight percent of the total polyester polyol component.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono-or di-esters of alcohols with 1 to 4 carbons, or dicarboxylic acid anhydrides. Dicarboxylic acid mixtures of succinic acid, glutaric acid and adipic acid in quantity ratios of 20–35:-35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., $\epsilon$-caprolactone or hydroxycarboxylic acids, e.g., $\omega$-hydroxycaproic acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Polyester polyols whose acid component advantageously comprises at least about 30 percent by weight of phthalic acid residues are useful. By phthalic acid residue is meant the group:

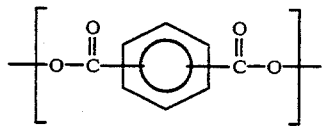

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality at least slightly greater than 2. Such suitable residues include those disclosed in U.S. Pat. Nos. 3,647,759; 4,411,949; 4,714,717; and 4,897,429; the disclosures of which with respect to the residues are hereby incorporated by reference.

Examples of suitable polyester polyols are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204, 254, 2541 and 254A polyols, which are available from Cape Industries. Phthalic anhydride derived polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company.

Polyoxyalkylene polyether polyols, which can be obtained by known methods, are also preferred for use as the polyhydroxyl compounds. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical.

Suitable cyclic ethers and alkylene oxides include, for example, tetrahydrofuran, 1,3-propylene oxide, 1,2- and 2,3-butylene oxide, styrene oxide, and preferably ethylene oxide and 1,2-propylene oxide. The alkylene cyclic ethers and oxides may be used individually, in alternation, one after the other or as a mixture. Examples of suitable initiator molecules include water, organic dicarboxylic acids such as succinic acid, adipic acid, phthalic acid and terephthalic acid, aliphatic and aromatic, optionally N-mono-, N,n-, and N,n'-dialkyl substituted diamines with 1 to 4 carbons in the alkyl radical, such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5-, and 1,6-hexamethylenediamine, phenylenediamines, 2,3-, 2,4-, and 2,6-toluenediamine and 4,4'-, 2,4'- and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia.

Particularly preferred in the production of the polyurethane foams of the invention are the polyester polyols, especially aromatic polyester polyols containing phthalic acid residues.

The polyol composition is also comprised of an organo-phosphorus compound having at least two isocyanate reactive hydrogens, the first essential ingredient in the combination. The organo-phosphorus compounds having at least two isocyanate active hydrogens are reactive with the isocyanate to form part of the polyurethane matrix, thereby promoting good char formation without collapse of the charred surface into fresh foam which can burn. The foams contain phosphorus atoms covalently bonded through one or more carbon atoms and/or oxygen atoms to a urethane group, thereby forming a part of the foam matrix. The reactive organo-phosphorus compound used in the invention may be distinguished from organo-phosphorus additives which are non-reactive with an isocyanate group because the latter do not form a part of the polyurethane matrix through covalent bonding to a urethane group, do not form a good charred surface which is resistant to collapse upon applied pressure, tend to leak out of the foam over a period of time, and contribute to increased density.

The organo-phosphorus compounds used in the invention have at least two isocyanate reactive hydrogens comprising thio groups, amino groups, hydroxyl groups, or mixtures thereof. Preferred are the organo-phosphorus polyols, defined herein as having at least two hydroxyl groups, but which may additionally have other of the aforementioned isocyanate reactive groups. Illustrative organo-phosphorus polyols which may be employed in the polyol composition of the present invention include phosphate polyols, phosphite polyols, phosphonate polyols, phosphinate polyols, phosphoramidates, polyphosphorus polyols, phosphinyl polyether polyols, and polyhydroxyl-containing phosphine oxides. Typical phosphate polyols are those prepared by (1) by the reaction of alkylene oxides with (a) phosphoric acids having a $P_2O_5$ equivalency of from 72 to 95 percent, (b) partial esters of these acids, or (c) esters prepared by the reaction of phosphorus pentoxide and alcohols; (2) by the oxidation of phosphites prepared by the reaction of trialkyl phosphites with polyhydroxyl-containing materials; and (3)by transesterifying the reaction products of (1) and (2). The preparation of these neutral phosphate polyols is known in the art as evidence by U.S. Pat. Nos. 3,375,305; 3,369,060; 3,324,202; 3,317,639; 3,317,510; 3,099,676; 3,081,331; 3,061,625; 2,909,559; 3,417,164; and 3,393,254.

Preferred are the phosphite polyols, which are meant to also include the diphosphites and the polyphosphite polyol compounds, optionally containing polyphosphates. Typical phosphite polyols are those prepared (1) by the reaction of alkylene oxides with phosphorus acid, (2) by the reaction of trialkylphosphites with polyhydroxyl-containing materials, and (3) by transesterifying the reaction products of (1) and (2). The preparation of these phosphite polyols is known in the art as evidenced by U.S. Pat. Nos. 3,359,348; 3,354,241; 3,352,947; 3,351,683; 3,320,337; 3,281,502; 3,246,05 1; 3,081,331; and 3,009,939; each incorporated herein by reference.

Particularly preferred phosphite polyols are the trialkyl phosphite polyols where each of the alkyl groups of the trialkyl phosphites independently have 1 to 20 carbon atoms, preferably 1 to 8. In one embodiment, the polyphosphite polyol has the general formula:

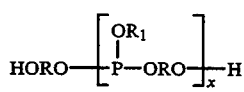

where R is the alkylene glycol or polyalkylene glycol residue, and $R_1$ is the alkyl residue from the trialkyl phosphite, and X is from 1 to 50. Suitable trialkyl phosphites from which the polyol may be derived include triisodecyl phosphite, triisoctyl phosphite, trilauryl phosphite, tristearyl phosphite, tri- methyl, ethyl, propyl, butyl, etc. phosphites, unsaturated phosphites such as triallyl phosphite, and mixed phosphites such as methyldiethyl phosphite and ethyldibutyl phosphite. Also included are the aryl-substituted phosphites. Typical phosphonate polyols are those prepared (1) by the reaction of alkylene oxides with phosphonic acid, (2) by the reaction of phosphite polyols with alkyl halides, (3) by the condensation of dialkyl phosphites with alkanolamines and formaldehyde, and (4) by transesterifying the products of (1), (2), and (3). The preparation of these phosphonate polyols is known in the art as evidenced by U.S. Pat. Nos. 3,349,150; 3,330,888; 3,342,651; 3,139,450; and 3,092,651.

Typical phosphinate polyols include (1) hydroxyalkyl phosphinic acids, (2) reaction products of alkylene oxides and hydroxyalkyl phosphinic acids, and (3) transesterified reaction products of (2). The preparation of these phosphinate polyols is known in the art as evidenced by U.S. Pat. No. 3,316,333.

Typical phosphoramidates include those disclosed in U.S. Pat. Nos. 3,335,129; 3,278,653; and 3,088,9661 Typical polyhydroxyl-containing phosphine oxides include the di- and tri-substituted hydroxylalkyl phosphine oxides such as trihydroxylmethyl phosphine oxides.

Also useful are the polyphosphorus compounds such as polyoxyalkylene polyether polyphosphorus compounds where the polyphosphorus atoms form part of the backbone chain. Illustrative examples are found in U.S. Pat. No. 3,878,270, which describes a polyalkylene glycol polyphosphorus compound having both phosphite and vinylphosphate linkages. Other examples include the polyphosphorus compounds described in U.S. Pat. Nos. 4,094,926; 3,989,652; 3,840,622; 3,764,640; and 3,767,732. These patents are in their entirety incorporated herein by reference.

Phosphinyl polyether polyols similar to the ones above which are useful in the invention are described in U.S. Pat. Nos. 3,660,314; 3,682,988; 3,760,038; incorporated herein by reference. Such polyols include polyether polyols substituted with organic phosphite groups, organic phosphonite groups, organic phosphinite groups, cyclic phosphite groups, which groups optionally are hydrolyzed to increase the hydroxyl functionality of the polyether polyol. These phosphinyl polyether polyols may be prepared by reacting a polyether polyol having a halogen with an organic phosphonite, phosphinite, or cyclic phosphite compound, where the halogen is replaced by phosphinyl groups.

Aromatic amino polyols containing phosphorus atoms are also useful and described in U.S. Pat. No. 4,681,965. Such polyols are prepared by the Mannich condensation reaction between a phenol, formaldehyde, a primary amine, and an alkanol phosphite. Other aliphatic amino polyols containing phosphorus atoms are described in U.S. Pat. Nos. 3,076,010 and 4,052,487. Each of these patents are incorporated herein by reference.

The amount of the organo-phosphorus compound is an amount effective to promote the desired char and flame retardancy, preferably to impart a Butler Chimney weight retention of 80 percent or greater to the resulting foam. Suitable amounts of phosphorus atoms present in the foam matrix can range from 0.05 to 2.0 weight percent based on the total weight of the foam ingredients, with amounts ranging from 0.15 to 0.4 weight percent being most preferred. In terms of weight percent of the organo-phosphorus compound based on the total weight of the polyols present in the formulation, suitable amounts can range from 2 weight percent to 50 weight percent with amounts from 5 to 15 weight percent being most preferred.

The second essential ingredient in the combination is a mono-halogenated hydrocarbon having from three to six carbon atoms. The mono-halogenated hydrocarbon is a co-blowing agent and may be added to the isocyanate side or to the polyol ingredients prior to the foaming reaction. The secondary or tertiary mono-halogenated aliphatic hydrocarbon co-blowing agent having three (3) to six (6) carbon atoms is a hydrocarbon-substituted with one halogen atom to enable the halogen to disassociate from the hydrocarbon as a free radical. The halogen atom is a secondary or tertiary halogen atom on the carbon backbone. The hydrocarbon may be substituted with alkyl groups. Examples of suitable mono-halogenated hydrocarbons used in the invention include 2-chloropropane, 2-chlorobutane, tertiary butyl chloride, and the iodine, fluorine, or bromine halogen substituted compounds of the foregoing. Preferred as a co-blowing agent is a secondary mono-halogenated aliphatic hydrocarbon with 3 to 4 carbon atoms, further with chlorine as the halogen. The most preferred compound is 2-chloropropane. These compounds are also volatile and volatilize into a gas at temperatures of less than 100° C. at one (1) atmosphere.

While the mono-halogenated hydrocarbon is termed herein a co-blowing agent, it is to be understood that the scope of the invention does not preclude a foam blown solely with this compound. Preferably, however, foams made according to the invention are blown with a mixture of blowing agents including the mono-halogenated hydrocarbon.

The blowing agents which can be used in addition to the mono-halogenated hydrocarbon may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates.

The organic carboxylic acids used are advantageously aliphatic mono- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichlorpropionic acid, hexanoic acid, 2-ethyl-hexanoic acid, cyclohexanecarboxylic acid, dodecanoic acid, palmitic acid, stearic acid, oleic acid, 3-mercapto-propionic acid, glycoli acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less. The most preferred physically active blowing agents are those which have an ozone depletion potential of 0.05 or less. Examples of physically active blowing agents are the volatile non-halogenated hydrocarbons having two to seven carbon atoms such as alkanes, alkenes, cycloalkanes having up to 6 carbon atoms, dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products.

Examples of volatile non-halogenated hydrocarbons include linear or branched alkanes, e.g. butane, isobutane, 2,3 dimethylbutane, n- and isopentane and technical-grade pentane mixtures, n- and isohexanes, n- and isoheptanes, n- and isooctanes, n- and isononanes, n- and isodecanes, n- and isoundecanes, and n- and isododecanes. Since very good results are achieved with respect to the stability of emulsions, the processing properties of the reaction mixture and the mechanical properties of polyurethane foam products produced when n-pentane, isopentane or n-hexane, or a mixture thereof is used, these alkanes are preferably employed. Furthermore, specific examples of alkenes are 1-pentene, 2-methylbutene, 3-methylbutene, and 1-hexene, of cycloalkanes are cyclobutane, preferably cyclopentane, cyclohexane or mixtures thereof, specific examples of linear or cyclic ethers are dimethyl ether, diethyl ether, methyl ethyl ether, vinyl methyl ether, vinyl ethyl ether, divinyl ether, tetrahydrofuran and furan, and specific examples of ketones are acetone, methyl ethyl ketone and cyclopentanone. Preferentially, cyclopentane, n- and isopentane, n-hexane, and mixtures thereof are employed.

Any hydrochlorofluorocarbon blowing agent may be used in the present invention. Preferred hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,1,2-trifluoroethane; 1-chloro-1,2,2-trifluoroethane; 1,1-dichloro-1,2-difluoroethane; 1-chloro-1,1,2,2-tetrafluoroethane (124a); 1-chloro-1,2,2,2-tetrafluoroethane(124);1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and trans-chlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane(HFC-134); 1,1-difluoroethane(HFC-152a); 1,2-difluoroethane(HFC-142), trifluoromethane; heptafluoropropane; 1,1,1-trifluoroethane; 1,1,2-trifluoroethane; 1,1,1,2,2-pentafluoropropane; 1,1,1,3-tetrafluoropropane; 1,1,2,3,3pentafluoropropane; 1,1,1,3,3-pentafluoro-n-butane; hexafluorocyclopropane (C-126); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane, -heptane, and -octane; perfluorodiethyl ether; and perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

The total and relative amounts of secondary or tertiary mono-halogenated aliphatic hydrocarbon co-blowing agent and the additional blowing agents will depend upon the desired foam density, the desired flame retardancy, the type of hydrocarbon, and the amount and type of additional blowing agents employed. Polyurethane foam densities typical for rigid polyurethane insulation applications range from free rise densities of 0.5 to 10 pcf, preferably from 1.2 to 3.5 pcf. The amount by weight of all blowing agents is generally, based on 100 pbw of the polyols having at least two isocyanate reactive hydrogens, from 0.05 to 45 pbw.

Water is typically found in minor quantities in the polyols as a byproduct and may be sufficient to provide the desired blowing from a chemically active substance. Preferably, however, water is additionally introduced into the polyol composition in amounts from 0.05 to 5 pbw, preferably from 0.5 to 4 pbw, based on 100 pbw of the polyols. The physically active blowing agents, if employed, make up the remainder of the blowing agent for a total of from 0.05 to 45 pbw. Although any amount of the mono-halogenated hydrocarbon within the range may be used, an effective amount is the quantity necessary to impart the desired flame retardancy, preferably an amount which will yield a foam having a Butler Chimney weight retention of 80 percent or greater.

The amount of halogen atoms present in the foam attributable to the secondary or tertiary mono-halogenated aliphatic hydrocarbon co-blowing agent, based on the weight of the total foam formulation including isocyanates, is calculated to be from 0.01 weight percent to 5 weight percent, more preferably from 0.5 weight percent to 1.5 weight percent, most preferably from 0.8 weight percent to 1.1 weight percent.

A preferred additional blowing agent comprises the non-halogenated aliphatic hydrocarbons having 5 to 6 carbon atoms. The proportion of these hydrocarbons to the secondary or tertiary mono-halogenated hydrocarbon preferably ranges from 0.5:1 to 39:1, respectively, and more preferably from 1.5:1 to 3.5:1, by weight.

A combination especially preferred to impart good flame retardancy as measured by the Butler Chimney test is as follows based on the total weight of the polyols:

a) from 50 to 98 weight percent of a polyester polyol, more preferably from 80 to 95 weight percent, optionally in mixture with 5 to 48 weight percent of a polyether polyol;

b) from 2 to 50 weight percent of an organo-phosphorus compound, more preferably from 5 to 15 weight percent;

c) a non-halogenated aliphatic hydrocarbon blowing agent comprising n-pentane, isopentane, hexane, cyclopentane, cyclohexane, and mixtures thereof, especially n-pentane/isopentane/cyclopentane or n-pentane/cyclopentane mixtures in amounts of from 15 to 30 pbw based on 100 pbw of the total polyols;

d) a secondary mono-halogenated aliphatic hydrocarbon blowing agent having three to four carbon atoms, more preferably 2-chloropropane, in an amount of from 4 to 15 pbw based on 100 pbw of the total polyols, more preferably from 5 to 10 pbw; and, e) a chemical blowing agent such as water in an amount of from 0.35 to 1.5 pbw based on 100 pbw of the total amount of polyols.

The organo-phosphorus compound is blended with the other polyols generally prior to injection into a mixhead, although it may be separately metered into the mixhead. The co-blowing agents also are generally mixed into the polyol component prior to injection into the mixhead. Some of the additional physically active blowing agents, such as the non-halogenated hydrocarbons pentane and cyclopentane, generally do not form stable homogeneous mixtures with the polyol component and typically must be emulsified, mixed, and vigorously agitated immediately prior to injection into the mixhead, or fed as a separate stream into a mixhead. However, an unexpected advantage of employing the mono-halogenated secondary or tertiary aliphatic hydrocarbon having three to six carbon atoms, such as 2-chloropropane, is that the non-halogenated hydrocarbon is easily solubilized in the polyols to form a storage stable mixture of polyols and blowing agents. Thus, in the present invention, one may blend the co-blowing agents and the polyol ingredients without emulsification for later use in the desired foaming application. Although it is preferred to mix the co-blowing agents with the polyol component ingredients prior to injection into a mixhead, it is also conceivable that the additional physically active blowing agents may be mixed with the isocyanate or separately metered into the mixhead.

Besides the polyols in the polyol composition, including the organo-phosphorus compound and optionally the co-blowing agents, there may also be included crosslinkers/chain extenders, surfactants, non-reactive (additive) organo-phosphorus flame retardants and other types of flame retardants, catalysts, dyes and pigments, fillers, anti-hydrolysis agents, and fungistatic and bacteriostatic agents.

Chain-extending agents which have no polyether or polyester groups may optionally be employed in the preparation of the polyurethane foams include those compounds having at least two functional groups bearing active hydrogen atoms and with number average molecular weights of less than 400, more preferably 46 to 300, such as water, hydrazine, primary and secondary diamines, amino alcohols, amino acids, hydroxy acids, glycols, or mixtures thereof. The weight of the chain extending agents are included as a part of the "polyols" for the purpose of calculating parts by weight of a compound based on 100 pbw of the polyols. A preferred group of chain-extending agents includes water, ethylene glycol, 1,3-propanediol, 1, 10-decanediol, o, -m, -p-dihydroxycyclohexane, diethylene glycol, 1,6-hexanediol, glycerine, trimethylol propane, 1,2,4-, 1,3,5-trihydroxycyclohexane, bis(2-hydroxyethyl)hydroquinone,1,4-butanediol and primary and secondary diamines which react more readily with a prepolymer than does water such as phenylene diamine, 1,4-cyclohexane-bis-(methylamine), ethylenediamine, diethylenetriamine,N-(2-hydroxypropyl)-ethylenediamine, N,N'-di(2-hydroxypropyl)ethylenediamine, piperazine, and 2methylpiperazine.

Examples of suitable surfactants are compounds which serve to support homogenization of the starting materials and may also regulate the cell structure of the plastics. Specific examples are salts of sulfonic acids, e.g., alkali metal salts or ammonium salts of fatty acids such as oleic or stearic acid, of dodecylbenzene- or dinaphthylmethanedisulfonic acid, and ricinoleic acid; foam stabilizers, such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 parts by weight, based on 100 parts by weight of the polyol component.

Catalysts may be employed which greatly accelerate the reaction of the compounds containing hydroxyl groups and with the modified or unmodified polyisocyanates. Examples of suitable compounds are organometallic compounds, preferably organotin compounds, such as tin(II) salts of organic carboxylic acids, for example, tin(II) acetate, tin(II) octanoate, tin(II) ethylhexanoate and tin(II) laurate, and the dialkyltin(IV) salts of organic carboxylic acids, for example, dibutyltin diacetate, dibutyltin dilaurate, dibutyltin maleate and dioctyltin diacetate, and tertiary amines, for example, triethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1,2-dimethylimidazole, 1-azabicylo[3.3.0]octane, and preferably 1,4-diazabicylo[2.2.2]octane, and alkanolamine compounds, such as triethanolamine, triisopropanolamine, N-methyl- and N-ethyldiethanolamine and dimethylethanolamine.

Any suitable urethane forming catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3methoxypropyldimethylamine, N,N,N'-trimethylisopropyl propylenediamine, 3diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

The foams made according to the invention are rigid or semi-rigid and closed celled for insulation purposes. By a polyurethane foam is meant a foam having some polyurethane linkages, such as a polyurethane (PU) foam where polyurethane linkages predominate, a polyurethane-polyisocyanurate (PU-PIR) foam where there exists a significant number of polyurethane and polyisocyanurate linkages, and polyisocyanurate (PIR) foams where the polyisocyanurate linkages predominate over the polyurethane linkages; but nevertheless, polyurethane linkages are present. To prepare the polyurethane foams containing a predominant number of isocyanurate linkages, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tris(dimethylaminopropyl)-, tris(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(diemthylaminopropyl)-s-hexahydrotriazine are polyisocyanurate catalysts which are generally used. The suitable polyisocyanurate catalyst is usually used in an amount of from 1 to 10 parts by weight, preferably form 1.5 to 8 parts by weight, based on 100 parts by weight of the total amount of polyols.

Other suitable catalysts :may optionally be employed in addition to the tertiary amine catalysts mentioned above. For example, tin catalysts may be used to shorten tack time and promote green strength. Suitable organotin tin catalysts are tin (II) salts of organic carboxylic acids, e.g., tin (II) acetate, tin (II) octanoate, tin (II) ethylhexanoate and tin (II) laurate, and dialkyltin (IV) salts of organic carboxylic acids, e.g., dibutyltin diacetate, dibutyltin diacetate, dibutyltin dilaurate, dibutyltin maleate, and dioctyltin diacetate. Preferred, however, are tin catalysts with tin-sulfur bonds which are resistant to hydrolysis, such as dialkyltin dimercaptides, including dimethyl-, dibutyl-, and dioctyl- tin dimercaptides.

Examples of suitable additive flameproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the polyols.

Optional flame retardant compounds are tetrakis(2-chloroethyl) ethylene phosphonate, pentabromodiphenyl oxide, tris(1,3-dichloropropyl) phosphate, tris(beta-chloroethyl)phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)phosphate, tris(beta-chloropropyl)phosphate, and melamine.

For the purposes of the invention, fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the 5polyols and the isocyanate); but the content of mats, nonwovens and wovens made from natural and synthetic fibers may reach values of up to 80 percent by weight.

The polyol component may be reacted with the organic isocyanate at isocyanate equivalence indices ranging from 95 to 500. The flame retardance of a PU-PIR or a PIR foam is increased as the isocyanate index increases. At indices ranging from 200 to 300 inclusive, the Butler Chimney weight retention of foams made according to the invention is 80 percent or more; while at indices ranging from greater than 300 to 350, the Butler Chimney weight retentions are 85 percent or more. At any given index, however, the flame retardant properties of rigid foams made according to the invention show improvement over comparable foams lacking either the organo-phosphorus polyol compound or the secondary or tertiary mono-halogenated aliphatic hydrocarbon blowing agent.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2'- and/or 2,6-toluene diisocyanate.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

The foams can be prepared batchwise or continuously by the prepolymer process or by the one-shot process using conventional low pressure or impingement mixers. The foam ingredients may be mixed at from 15° to 90° C., preferably at 20° to 35° C., and introduced into an open mold optionally preheated, or poured or sprayed onto a substrate or into a cavity. The foams have applications where insulation is desired such as home refrigerators, industrial or equipment casings, jackets in hot water tanks or pipes, and residential and commercial building insulation.

The foams prepared herein are rigid and closed cell. By a closed cell polyurethane foam is meant that at least 85% of the cells are closed. For insulation purposes, it is preferred that greater than 90%, more preferably 95% or more, most preferably 97% or more of the cells are closed.

The following non-limiting examples illustrate an embodiment of the invention:

TERATE® 2541 is a polyester polyol made by reacting dimethylterephthalate with ethylene glycol and having an OH number of about 240, commercially available from Cape Industries.

WESTON® PTP is heptakis(dipropyleneglycol)triphosphite, having what is believed to be an OH number of about 275, commercially available from GE Specialty Chemicals and listed as CAS No. 13474-96-9.

WESTON® 430 is a trisdipropylene glycol phosphite having what is believed to be an OH number in the range of 385 to 405, commercially available from GE Specialty Chemicals and listed as CAS No. 36788-39-3.

B-8432 is a silicone surfactant commercially available from Goldschmidt Corporation.

HEXCHEM® 977 is potassium octoate, a polyisocyanurate-promoting catalyst.

POLYCAT® 5 is pentamethyldiethylenetriamine, a polyurethane-promoting catalyst commercially available from Air Products.

ISO A is a polymethylene polyphenylene polyisocyanate having a free NCO content of about 31 weight percent and a viscosity at 25° C. of about 700 cps.

EXAMPLE I

All of the polyol ingredients listed in Table I were mixed at the stated parts by weight and pumped as a stream along with the Iso A as a separate stream into a high pressure foam machine calibrated as the settings listed below in Table I. The foaming ingredients were poured into a #10 Lily cup to measure the free rise density, and into panels measuring 10"×10"×4" at free rise, 10 percent overpacking and 20 percent overpacking. The foams taken from the panels overpacked at 10 percent were tested according to ASTM D3014 to measure the Butler weight retention and flame extinguishing times.

TABLE I

| SAMPLES | 1 | 2 | 3 | 4 | 5 | 6 | 7 | 8 | 9 | 10 | 11 | 12 |
|---|---|---|---|---|---|---|---|---|---|---|---|---|
| TERATE 2541 | 90 | 90 | 90 | 90 | 90 | 90 | 100 | 100 | 100 | 100 | 100 | 100 |
| WESTON PTP | 10 | 10 | 10 | — | — | — | — | — | — | — | — | — |
| WESTON 430 | — | — | — | 10 | 10 | 10 | — | — | — | — | — | — |
| B-8432 | 2 | 2 | 2 | 2.5 | 2.5 | 2.5 | 2.5 | 2.5 | 2.5 | 2.5 | 2.5 | 2.5 |
| HEXCHEM-977 | 3 | 3 | 3 | 2.7 | 2.7 | 2.7 | 2.7 | 2.7 | 2.7 | 2.7 | 2.7 | 2.7 |
| POLYCAT 5 | 0.5 | 0.5 | 0.5 | 0.4 | 0.4 | 0.4 | 0.5 | 0.5 | 0.5 | 0.4 | 0.4 | 0.4 |
| CYCLOPENTANE | 23 | 23 | 23 | 33 | 35 | 37.5 | 24 | 24 | 24 | 33 | 36 | 36 |
| 2-CHLOROPROPANE | 7 | 7 | 7 | — | — | — | 12 | 12 | 12 | — | — | — |
| WATER | 0.5 | 0.5 | 0.5 | 0.5 | 0.5 | 0.5 | 0.5 | 0.5 | 0.5 | 0.5 | 0.5 | 0.5 |
| TOTAL | 136 | 136 | 136 | 139.1 | 141.1 | 143.6 | 142.2 | 142.2 | 142.2 | 139.1 | 142.1 | 142.1 |
| PERCENT P | 0.29 | 0.27 | 0.26 | — | — | — | — | — | — | — | — | — |
| PERCENT Cl | 0.99 | 0.94 | 0.90 | — | — | — | — | — | — | — | — | — |
| INDEX | 275 | 300 | 325 | 250 | 300 | 350 | 250 | 300 | 350 | 275 | 325 | 275 |
| ISO A | 179.6 | 195.9 | 212.3 | 170.6 | 204.7 | 238.9 | 161.2 | 193.4 | 225.7 | 177.32 | 209.56 | 177.32 |
| SHOT TIME/FREE RISE | 3.0 | 3.0 | 3.5 | — | — | — | 3.0 | 3.0 | 3.0 | 3.0 | 3.0 | 3.0 |
| LILY CUP, pcf | 1.57 | 1.68 | 1.74 | 1.4 | 1.6 | 1.75 | 1.32 | 1.55 | 1.79 | 1.37 | 1.56 | 1.43 |
| FREE RISE BOX | | | | | | | | | | | | |
| WEIGHT (g) | 190.7 | 191.7 | 199.3 | — | — | — | 156.5 | 182.6 | 194.3 | 174 | 183 | 180.7 |
| P.C.F. | 1.81 | 1.82 | 1.90 | 1.53 | 1.6 | 1.87 | 1.49 | 1.74 | 1.85 | 1.66 | 1.74 | 1.72 |
| 10 PERCENT PACKED PANEL* | | | | | | | | | | | | |
| WEIGHT (g) | 210.9 | 212.3 | 220.0 | — | — | — | 172.4 | 200.8 | 218.5 | 210.4 | 209.7 | 210.6 |
| P.C.F. | 2.01 | 2.02 | 2.09 | 1.71 | 1.75 | 2.03 | 1.64 | 1.91 | 2.08 | 2.00 | 2.00 | 2.00 |
| 20 PERCENT PACKED PANEL | | | | | | | | | | | | |
| WEIGHT (g) | 227.3 | 229.0 | 237.5 | — | — | — | — | — | — | — | — | — |
| P.C.F. | 2.16 | 2.18 | 2.26 | 2.0 | 1.98 | — | — | — | — | — | — | — |
| CALIBRATION | | | | | | | | | | | | |
| RESIN | 95.3 | 86.8 | 81.5 | — | — | — | 125.1 | 106.5 | 106.0 | 94.0 | 97.0 | 92.0 |
| ISO | 127.0 | 127.0 | 126.4 | — | — | — | 142.2 | 140.8 | 165.0 | 119 | 144 | 117 |
| RPM RESIN | 669 | 605 | 541 | — | — | — | 22.2 | 18.2 | 18.2 | 20 | 20 | 20 |
| RPM ISO | 750 | 750 | 750 | — | — | — | 24.8 | 25.2 | 30.2 | 16 | 25.2 | 20.0 |
| PRESSURE RESIN | 2300 | 2300 | 2300 | — | — | — | 2200 | 2200 | 2200 | 2000 | 2000 | 2000 |
| PRESSURE ISO | 2000 | 2000 | 2000 | — | — | 2000 | 2000 | 2000 | 2000 | 2000 | 2000 | |
| BUTLER CHIMNEY | 84 | 86 | 89 | 58.9 | 66.9 | 77 | 54.4 | 63.9 | 73.2 | 65.9 | 67.0 | 62.4 |
| SX TIME | 11 | 10 | 10 | 16 | 17 | 14 | 22 | 19 | 17 | 14 | 17 | 17 |

*Samples 10-12 are based on making 2.00 pcf packed panels.

Samples 1-3 are to be compared with Comparative Samples 4-12. At about 2 pcf densities, Foam Samples 1-3 made with the combination of the organo-phosphorus compound having isocyanate active hydrogens and 2-chloropropane with cyclopentane unexpectedly exhibited Butler Chimney weight retentions of over 80 weight percent. Comparative Foam Samples 4-6 contained an organo-phosphorus compound having isocyanate active hydrogens but were not additionally blown with 2-chloropropane. As a result, the Butler Chimney test results, when compared to Foam Samples 1-3 at equivalent or similar isocyanate indices, were far worse as shown by the values below 80 weight percent. Foam Samples 7-9 were made with 2-chloropropane but without any organo-phosphorus compound. As can be seen by the Butler Chimney test results, the flame retardancy of Foam Samples 7-9 suffered when compared to Foam Samples 1–3 at similar or equivalent isocyanate indices. Finally, Foam Samples 10–12 were made without the organo-phosphorus compound or 2-chloropropane and were blown with cyclopentane and water. A comparison of Foam Samples 1–3 shows significant improvement in flame retardancy over Samples 10–12. In summary, the results indicate that only the combination of the organo-phosphorus compound and the monohalogenated aliphatic hydrocarbon 2-chloropropane impart a significantly improved flame retardancy as measured by the Butler Chimney test; whereas, each of these compounds taken alone fail to yield a foam having suitable flame retardancy.

What we claim is:

1. A process for making a polyurethane foam comprising the reaction product of an organic aromatic isocyanate with a polyol composition, said polyol composition comprising:
   a) a compound having at least two isocyanate reactive hydrogens, and
   b) an organo-phosphorus compound having at least two isocyanate reactive hydrogens,
said isocyanate and polyol composition reacted in the presence of
   c) a non-halogenated liquid hydrocarbon having five to seven carbon atoms, and
   d) a secondary or tertiary mono-halogenated hydrocarbon having three to six carbon atoms.

2. The process of claim 1, wherein the polyol composition comprises:
   a) a polyoxyalkylene polyether polyol, a polyester polyol, or mixtures thereof, and
   b) an organo-phosphorus polyol,
said isocyanate and polyol composition reacted in the presence of:
   c) pentane, cyclopentane, or mixtures thereof, and
   d) a secondary mono-halogenated compound having three to four carbon atoms.

3. The process of claim 2, wherein the hydrocarbon d) comprises 2-chloropropane.

4. The process of claim 3, wherein the hydrocarbon c) comprises cyclopentane, the compound a) comprises a polyester polyol, and the compound b) comprises an organophosphite polyol.

5. The process of claim 1, wherein the hydrocarbon d) comprises 2-chloropropane.

6. The process of claim 1, wherein the hydrocarbons c) and d) are mixed into the polyol composition prior to reacting the polyol composition with the isocyanate.

* * * * *